US012390396B2

(12) United States Patent
Kaveh et al.

(10) Patent No.: US 12,390,396 B2
(45) Date of Patent: Aug. 19, 2025

(54) PERSONAL USE CONTAINER

(71) Applicants: Sassan Kaveh, Las Vegas, NV (US); Daniel Kiarash Kaveh, Las Vegas, NV (US); Ashton Ashkan Kaveh, Las Vegas, NV (US)

(72) Inventors: Sassan Kaveh, Las Vegas, NV (US); Daniel Kiarash Kaveh, Las Vegas, NV (US); Ashton Ashkan Kaveh, Las Vegas, NV (US)

( * ) Notice: Subject to any disclaimer, the term of this patent is extended or adjusted under 35 U.S.C. 154(b) by 64 days.

(21) Appl. No.: 18/404,015

(22) Filed: Jan. 4, 2024

(65) Prior Publication Data

US 2025/0221888 A1 Jul. 10, 2025

(51) Int. Cl.
*A45D 44/00* (2006.01)
*A61J 1/03* (2023.01)

(52) U.S. Cl.
CPC .................................... *A61J 1/03* (2013.01)

(58) Field of Classification Search
CPC ........... B65D 2543/00296; B65D 2543/00527; B65D 2543/0062; B65D 2543/00731; B65D 2543/00537; B65D 21/086; B65D 85/20; B65D 85/12; A45D 44/18; A61J 3/071
USPC ...... 220/4.06, 4.21, 4.07, 8, 780; 206/362.2, 206/530
See application file for complete search history.

(56) References Cited

U.S. PATENT DOCUMENTS

| | | | | | |
|---|---|---|---|---|---|
| 2,718,980 | A * | 9/1955 | Strom | B65D 43/0212 | 220/780 |
| 2,815,057 | A * | 12/1957 | Tupper | A45D 44/18 | 403/41 |
| 2,950,813 | A * | 8/1960 | Koones | A61J 3/08 | 206/530 |
| 2007/0119736 | A1* | 5/2007 | Kayser | A46B 5/0079 | 206/362.2 |

* cited by examiner

*Primary Examiner* — King M Chu
(74) *Attorney, Agent, or Firm* — Snell & Wilmer L.L.P.

(57) ABSTRACT

A personal use container, such as for containing and transporting pills, has a base which is configured to engage a cap, where the base and cap both have open and closed ends and when engaged, define a closed interior of the container. The cap and base may include inter-engaging members, such as a rib and groove, to retain them in their connected position. The container may have at least one flat side surface and a flat end surface to permit position of the container on a support surface. The container may include visual indicators and at least one portion may be transparent to permit viewing into the interior.

10 Claims, 3 Drawing Sheets

PERSONAL USE CONTAINER

FIELD OF THE INVENTION

The present invention relates to devices for holding personal items, such as medicants or similar pills.

BACKGROUND OF THE INVENTION

The majority of adults require daily medications, and it is not always possible to administer these necessary medications while at home. Some do-it-yourselfers wrap pills in paper napkins, cellophane or foil before placing them in a pocket or purse. Unfortunately, such wrappings are easily undone or lost entirely before it is time to administer the pill.

There is always the temptation to take the entire bottle of pills, using the protective container as a portable pill capsule. Not only does such use risk loss of the entire container, for maintenance medications, the majority are now provided in 90-day supplies, making the container bulkier to carry and the potential loss expensive.

Most commercially available pill containers are intended for organizing daily medications over a week's time span. They are seldom designed for easy portability, have no area for writing pill identification information, and are not configured for easily carrying in a pocket or to fit in a smaller compartment in a purse or handbag. The closures for the individual compartments are not robust, and most easily come open, spilling their carefully divided contents within the pocket, purse or handbag.

Similar problems exist relative to other personal items. The present invention is directed to overcoming these and other problems.

SUMMARY OF THE INVENTION

Aspects of the invention comprise a holder or container, particularly configured for personal use, such as for removably storing a plurality of pills, and methods of making and using the same.

In one embodiment, the invention comprises a two-piece container that is small and easily carried, yet the two pieces are securely connectable, so as to be water and child-resistant. In one configuration, one of the container pieces has a reduced diameter portion that is insertable into the second container piece, there the two pieces are securable using a mating ridge (formed on one of the pieces) and groove (formed in the other piece) connection.

In one embodiment, the container may have a capsule shape, having a generally cylindrical main portion with generally hemi-spherical ends, thus facilitating location of the container in a person's pocket or the like.

In one embodiment, a flattened surface may be defined on am exterior side of the container, providing a location for attachment of adhesive stickers on which users can write information, such as identifying the contents (such as medications), dosages, time for taking, with/without food, and other drug use information, and aiding in preventing the container from rolling. In some embodiments, one or both ends of the container may define a generally planar surface, such as for supporting the container in an upright position.

The container may be provided in a variety of sizes, such as designed to hold a number of pills for a certain period of time, such as one day, a few days, or a week. The container (s) may include a visual indicator, such as a color indicator, corresponding to different sized containers. At least one portion of the container may be generally transparent to permit viewing of the contents thereof.

Further objects, features, and advantages of the present invention over the prior art will become apparent from the detailed description of the drawings which follows, when considered with the attached figures.

DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
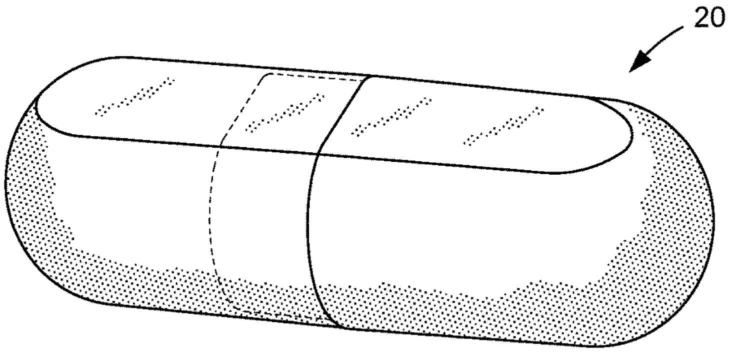
FIG. 1 is perspective view of a container in accordance with a first embodiment of the invention.

FIG. 1 shows a container 20 in accordance with one embodiment of the invention. The container 20 is preferably configured for personal use, such as for storing and transporting person items. In a preferred embodiment, such items may be medicants, such as in pill or capsule form. However, the container 20 may be used to store and transport other items. Further, the personal use configuration of the container 20 is preferably designed to allow the container to be easily transported by a person, such as a pocket.

Figure 2:
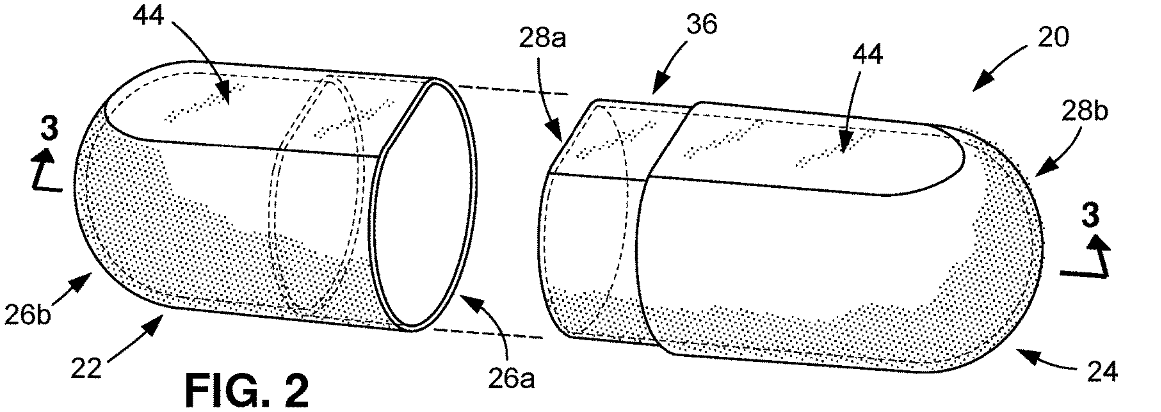
FIG. 2 is an exploded view of the container illustrated in FIG. 1.
Figure 3:
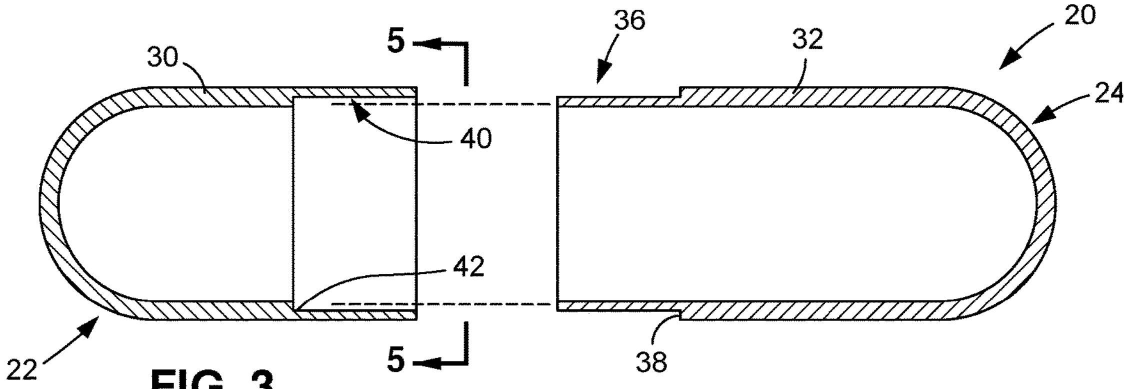
FIG. 3 is a cross-sectional view of the container illustrated in FIG. 2, taken along line 3-3 therein.

As illustrated in FIG. 2, the container 20 comprise two pieces: a first piece or cap 22 and a second piece or base 24. In one embodiment, the cap 22 comprises a generally cylindrical body having a first open end 26*a* and a second closed end 26*b*, where the second closed end is generally hemi-spherical in shape. Likewise, the base 24 comprises a generally cylindrical body having a first open end 28*a* and a second closed end 28*b*, where the second closed end is generally hemi-spherical in shape. In one embodiment, as best illustrated in FIG. 3, the body of the cap 22 is defined by a wall 30 (where the wall of the cap thus has a terminus or distal portion which defines the open end 26*a*), and the body of the base 24 is defined by a wall 32 (where the wall of the base also has a terminus or distal portion which defines the open end 28*a*). In one embodiment, the cap 22 and body 24 may be formed from a polymer, and preferably synthetic polymers, such as plastic (such as polypropylene or polyethylene), such as in a molding process, and so as to be generally rigid.

Figure 4:
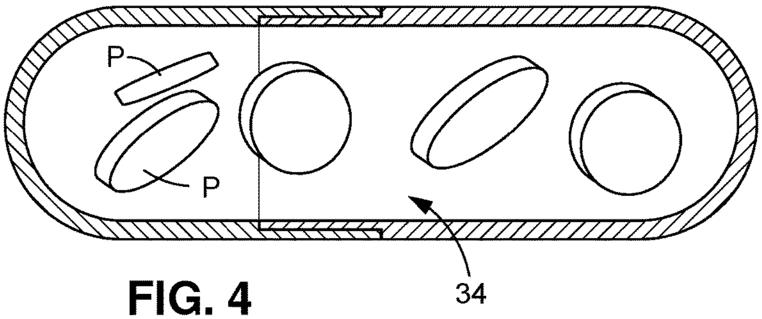
FIG. 4 is an assembled view of the container illustrated in FIG. 3, illustrated with one or more pills therein.

The cap 22 and body 24 are selectively connectable to one another and selectively disconnectable from one another. As illustrated in FIG. 1, when the cap 22 and body 24 are connected, the container 20 comprises a generally closed body which is capsule-shaped, such as having a first end, a second end and a middle portion therebetween, where the middle portion is generally cylindrical. As illustrated in FIG. 4, the container 20 defines a generally closed interior 34, such as to house one or more pills P (or medicants in other forms, other personal items, etc.) therein.

As indicated, the cap 22 and body 24 are preferably connectable and disconnectable. In one embodiment, at least one of the cap 22 or body 24 has a reduced dimension portion or extension for fitting into the other. For example, as illustrated in FIGS. 2 and 3, the base 24 may have a reduced dimension portion 36 at the open end 28*a* thereof for fitting into the open end 26*a* of the cap 22.

In one embodiment, the reduced dimension portion 36 may be formed by a reduced thickness in the wall 32 of the base 24, where the wall thickness reduction may result in a ledge or step 38 on an exterior of the base 24, or where the reduced dimension portion 36 comprises an extension of the base 24, having such a reduced dimension characteristic (in relation to the cap 22 into which it fits, as detailed herein). In one embodiment, the cap 22 may define an inset area 40 for matingly accepting the reduced dimension portion 26 of the base 24, such as an area of reduced wall thickness which similarly results in a step or ledge 42 on the interior of the cap 22 (again, the inset area 40 might be configured as an extension portion of the cap 22 and have such characteristics).

In such a configuration, when the cap 22 and base 24 are connected, as best illustrated in FIG. 4, the reduced dimension portion/extension 36 of the base 24 may fit into the inset area/extension 40 of the cap 22, with the base 24 abutting (contacting or located adjacent to) the step or ledge 42 in the cap 22, and with the cap 22 abutting (contacting or located adjacent to) the step or ledge 38 on the exterior of the base 24.

Figure 5:
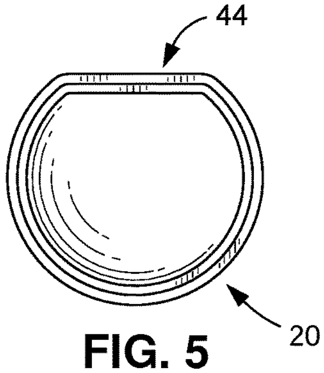
FIG. 5 is a cross-sectional view of the container illustrated in FIG. 3, taken along line 5-5 therein.

In one embodiment, the container 20 may define a generally planar exterior area, such as along an exterior portion of the middle section thereof. The generally planar exterior area may comprise a flattened section 44 of at least one of, and preferably both, the cap 22 and base 24, as illustrated in FIGS. 2 and 5. The generally planar or flattened surface or section 44 stabilizes the holder on flat surfaces, preventing roll-off. The generally planar or flattened surface or section 44 may also be used to receive adhesive labels identifying the drug(s) placed inside, or writing directly onto the container 20. Of course, the size and shape of the generally planar exterior section 44 may vary, including just on the cap 22 or base 24, and the container might include more than one such section or area, such as approximately 180 degrees from one another around the container 20.

Figure 6:
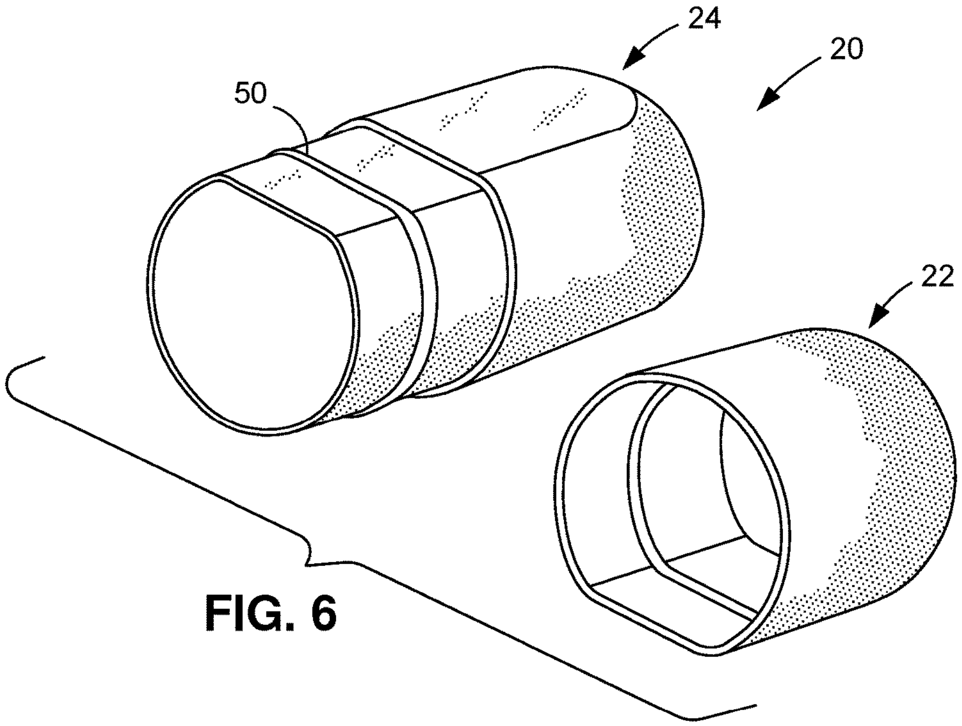
FIG. 6 is a perspective exploded view of a container in accordance with another embodiment of the invention.
Figure 7:
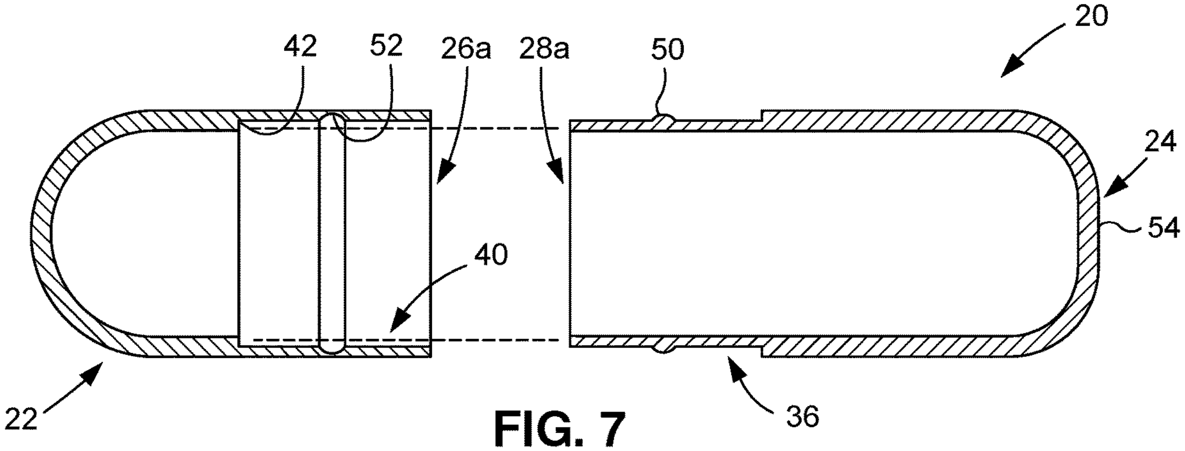
FIG. 7 is an exploded cross-sectional view of the container illustrated in FIG. 6.
Figure 8:
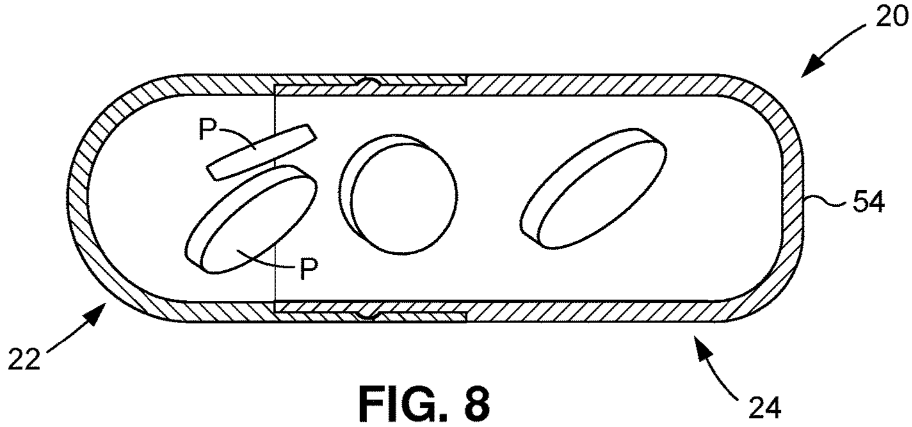
FIG. 8 is an assembled view of the container illustrated in FIG. 7, illustrated with one or more pills therein.
Figure 9A:
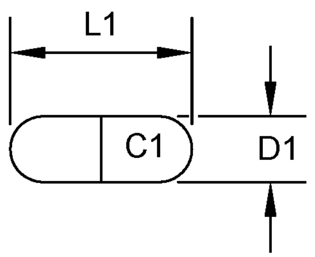
FIGS. 9*a-d* illustrate different sizes of containers in accordance with the invention.
Figure 9B:
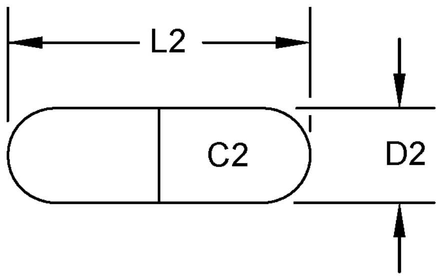
Figure 9C:
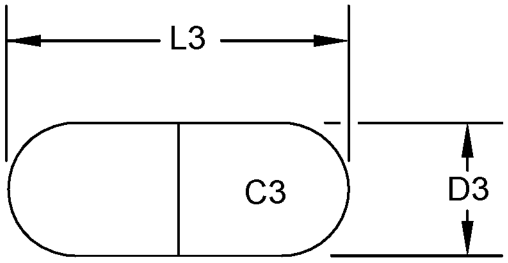
Figure 9D:
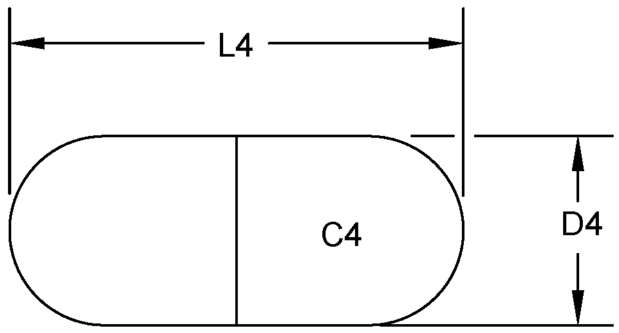

In one embodiment, the cap 22 and base 24 may remain connected to one another via friction therebetween, such as between the reduced dimension portion 36 of the base 24 against the inset area 40 of the cap 22. However, in a preferred embodiment of the invention, the container 20 may include a means for connecting or engaging the cap 22 and base 24. As illustrated in FIGS. 6-8, the cap 22 and base 24 may be connected via mating connectors. In one embodiment, the connectors comprise a raised rib, ridge or ring on one portion of the container 20, which rib, ridge or ring is configured to engage a groove on the other portion of the container 20.

For example, as illustrated, a raised rib or ring 50 extends outwardly from the exterior of the base 24, and is preferably located at the reduced dimension portion 36 thereof. A mating groove 52 may extend into the interior of the cap 22, and is preferably located at the inset area 40 thereof. When an end of the base 24 is configured to abut the step or ledge 42 of the cap 22, the ring 50 is preferably located the same distance from the open end 28*a* of the base 24 as is the groove 52 from the step or ledge 42 of the cap 22.

In one embodiment, the rib or ring 50 causes the base 24 to have an exterior dimension which the same as or slightly greater than the open end 26*a* of the cap 22, thus requiring the base 24 to be press-fit into the cap 22, preferably to the point where the rib or ring 50 fits into the groove 52, thus connecting the cap 22 and base 24 and resisting disconnection thereof.

In one embodiment, the rib or ring 50 and mating groove 52 extend circumferentially around the cap 22 (interior) and base 24. In other embodiments, however, the rib or ring 50 (or other engaging elements) might comprise individual nubs or bumps or the like, such as for engaging a contiguous groove 52 or mating depressions.

In a preferred embodiment, as illustrated in both FIGS. 2 and 7, the length of the base 24 exceeds the length of the cap 22, thus providing a container 20 having greater volume for storage than where both holder pieces are of substantially the same length. In one embodiment, for example, the base 24 is about 25-50%, and most preferably about 40% percent longer than the cap 22.

The container 20 may have a variety of configurations. As one example, for a container 20 having a length of 76.27 mm and a width/diameter of 31.83 mm, the base 24 may have a length of 63.35 mm, with the reduced dimension portion 36 having a length of 25 mm. The raised ring 50 may be 2.3 mm in width and have a height of 1.08 mm and be positioned 11.74 mm from the open end 28*a* and 13.06 mm from step or ledge 38. The height of the step or ledge 38 may be about 2.42 mm and the generally planar area 44 of the base 24 may measure 14.48 mm in width. The cap 22 may be 38.11 mm in length and 31.41 mm in width, with the generally planar area 44 having a width of 14.48 mm. The stop or ledge 42 of the cap 22 may be positioned about 26.45 mm from the open end 26*a* and have a height of 2.58 mm. The groove 52, also formed in the interior surface of the cap 22 may have a width of 2.36 mm and a central depth of approximately 0.44 mm. The centerline of the groove 52 may be about 13.10 mm from the open end 26*a* of the cap 22. The thickness of the walls 30,32 may be about 1.22 mm, except in the reduced dimension section 36 and inset area 40.

In one embodiment, the container 20 may be configured in different sizes, such as illustrated in FIG. 9*a*-*d*, such as to provide differing holder volumes, meeting the varying storage and transport requirements of the user. Such volumes might be configured, for example, to allow a user to store a number of medicants, such as pills, for one day, a few days, several days, or a week:

| Length (inches) | | Width (inches) | |
|---|---|---|---|
| L1 | 1.200 | W1 | 0.434 |
| L2 | 2.000 | W2 | 0.620 |
| L3 | 2.250 | W3 | 0.879 |
| L4 | 3.000 | W4 | 1.250 |

In this regard, the container 20 is preferably configured so that the interior area 34 will accept therein one or more, and preferably a plurality of, pills (which pills may have a variety of shapes and sizes, and may have tablet, capsule or other configurations, such as is well-known in the art relative to existing medicants).

The container 20 of the invention has a number of advantages and may have other configurations or features.

As described, one or both ends of the container 20 (as defined by the closed end 26*b* of the cap 22 and the closed end 28*b* of the base 24) may be generally hemispherical, such as to provide greater mechanical resistance to deformation and to present smooth exterior surfaces to the user and for storage (such as to facilitate location of the container 20 into a pocket or the like). In one embodiment, however, and as illustrated in FIGS. 7 and 8, at least one end of the container 20, such as the closed end 28*b* of the base 24, may define a generally flat portion 54 (such as a generally circular-shaped planar end which lies in a plane which is generally perpendicular to a centerline through the container 20 from end-to-end, such as to permit the container to sit upright on a support surface (such as a counter, a shelf of a medicine cabinet, etc.).

As described above, in one embodiment, the raised ring 50 and groove 52 are preferably formed about the entire circumference of the base 24 and cap 22. Their respective lateral positions are so located on the cap and body that mating occurs upon the extension terminus of the base 24 reaches the step or ledge 42 inside the cap 22. Full insertion also places the open end 26*a* of the cap 22 against the step or ledge 38 of the base 24. This (along with engagement of the ring and groove), prevents inadvertent separation or opening of the container 20, assists in forming a water resistant connection, and opening the joined pieces likely requires motor skills that exceeds the abilities of most children.

In one embodiment, as illustrated in FIG. 9*a-d*, at least one portion of the container 20 may include an identifier, such as a visual identifier, and preferably a color. In one embodiment, the base 24 may include a color identifier, such as where the bases 24 of different sized containers 20 comprises a different color identifier (such as colors C1, C2, C3 and C4 for the different sized containers in this example). The color indicators may be defined by a color of the molded polyethylene or other material, for example). The color indicator allows a user to more easily identify the different sized pill containers 20, such as when selecting a particular sized container 20 for a particular use (such as from a group of the containers having different sizes).

Further, at least one other portion of the container 20, such as the cap 22, may be generally transparent, thus allowing the user to see through the cap 22 into the interior 34 of the container 20. This allows a user to see, for example, the pills (or other contents) which are inside the container 20. Of course, in other embodiments, the generally transparent area might be a portion of the container 20, such as a window.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A personal use container comprising:

a cap comprising a wall having an exterior and an interior, said cap having a first open end and a second closed end, an inset area extending inwardly from said first open end into said interior and defining a step in said interior, and a groove located in said inset area; and a base comprising a wall having an exterior and an interior, said base having a first open end and a second closed end, a reduced dimension portion extending along a portion of said exterior to a step, and a ring extending outwardly from said reduced dimension portion;

wherein a length of said base from said first open end to said second closed end is longer than a length of said cap from said first open end to said second closed end thereof; and wherein said reduced dimension portion of said base is configured to be positioned in said inset area of said cap with said ring located on said base located in said groove of said cap, whereby said exterior of said wall of said cap is coplanar with said exterior of said wall of said base when said end of said wall of said cap abuts said step of said base, and said cap and base cooperate to define a generally closed and sealed interior space configured to hold one or more personal items;

wherein said closed end of said cap and said closed end of said base are generally hemispherical in shape and said closed end of at least one of said cap and base has a flat area configured to allow said personal use container to be positioned upright on a support surface, and wherein when said cap and base are connected said personal use container has a first end and a second end and a middle section, said middle section being generally cylindrical in shape, at least a portion of said middle section being generally planar to inhibit rolling of said personal use container when located on said support surface.

2. The personal use container in accordance with claim 1, wherein said base comprises a first visual color indicator.

3. The personal use container in accordance with claim 2, wherein said cap is generally transparent.

4. The personal use container in accordance with claim 1, wherein when said cap and base are connected, an end of said wall of said base abuts said step in said interior of said cap and an end of said wall of said cap abuts said step at said exterior of said base.

5. A plurality of personal use containers comprising:

a first personal use container comprising:

a first cap comprising a wall having an exterior and an interior, said first cap having a first open end and a second closed end, an inset area extending inwardly from said first open end into said interior and defining a step in said interior, and a groove located in said inset area; and a first base comprising a wall having an exterior and an interior, said first base having a first open end and a second closed end, a reduced dimension portion extending along a portion of said exterior to a step, and a ring extending outwardly from said reduced dimension portion;

wherein said reduced dimension portion of said first base is configured to be positioned in said inset area of said first cap with said ring located on said first base located in said groove of said first cap, whereby said first cap and first base cooperate to define a generally closed and sealed interior space configured to hold one or more personal uses, and wherein said first personal use container has a first length, a first width and said interior space has a first volume, and wherein at least a portion of said first personal use container includes a first color identifier; and a second personal use container comprising:

a second cap comprising a wall having an exterior and an interior, said second cap having a first open end and a second closed end, an inset area extending inwardly from said first open end into said interior and defining a step in said interior, and a groove located in said inset area; and a second base comprising a wall having an exterior and an interior, said second base having a first open end and a second closed end, a reduced dimension portion extending along a portion of said exterior to a step, and a ring extending outwardly from said reduced dimension portion;

wherein said reduced dimension portion of said second base is configured to be positioned in said inset area of said second cap with said ring located on said second base located in said groove of said second cap, whereby said second cap and second base cooperate to define a generally closed and sealed interior space configured to hold one or more personal uses, and wherein said second personal use container has a second length, a second width and said second interior space has a second volume, and wherein at least a portion of said second personal use container includes a second color identifier, said second length exceeding said first length, said second width exceeding said first width, said second volume exceeding said first volume, and said second color identifier being different than said first color identifier.

6. The plurality of personal use containers in accordance with claim 5, wherein said first personal use container has a first end and a second end and said second personal use containers has a first end and a second end, and wherein at least one end of each of said first and second personal use containers is generally flat.

7. The plurality of personal use containers in accordance with claim 5, wherein at least a portion of the first cap or first base between said first and second ends thereof is generally planar and wherein at least a portion of said second cap or second base between said first and second ends thereof is generally planar.

8. The plurality of personal use containers in accordance with claim 5, wherein said at least a portion of each of said first and second personal use containers is generally transparent.

9. The plurality of personal use containers in accordance with claim 5, wherein said first personal use container has a first end and a second end and a middle portion, said middle portion being generally cylindrical in shape.

10. The plurality of personal use containers in accordance with claim 9, wherein at least one of the first and second ends of said first personal use container is generally hemispherical in shape.

* * * * *